March 21, 1933.　　P. ROSENBERG　　1,902,377

FLASH LIGHT

Filed Dec. 4, 1930　　2 Sheets-Sheet 1

Inventor:
Paul Rosenberg
by M Schoenborn
Attorney

March 21, 1933.   P. ROSENBERG   1,902,377
FLASH LIGHT
Filed Dec. 4, 1930   2 Sheets-Sheet 2
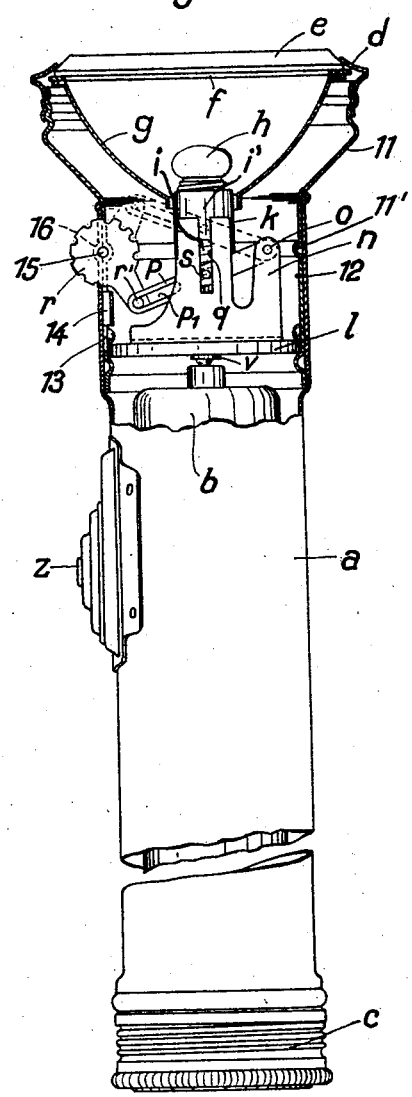
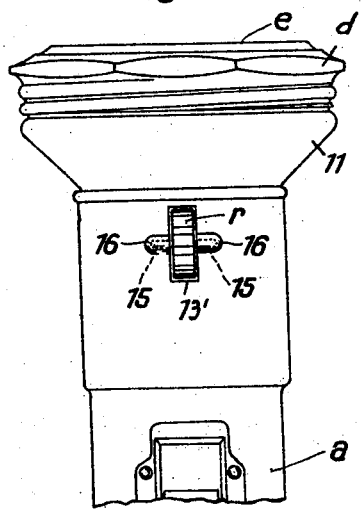
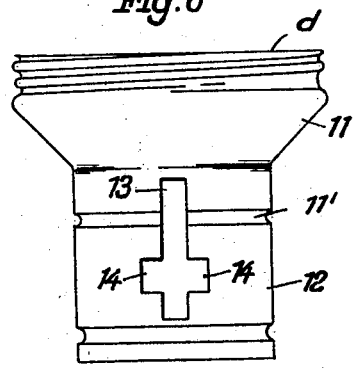
Inventor:
Paul Rosenberg
by M Schoenborn
Attorney Patented Mar. 21, 1933

1,902,377

UNITED STATES PATENT OFFICE

PAUL ROSENBERG, OF BERLIN, GERMANY, ASSIGNOR TO WALTER ROSENBERG, OF BERLIN, PANKOW, GERMANY

FLASH LIGHT

Application filed December 4, 1930, Serial No. 500,113, and in Germany March 11, 1929.

My invention relates to flash lights having a source of light which is adapted to be adjusted with respect to its reflector, and it is an object of my invention to improve a flash light of this type.

To this end I provide a forked lever which is mounted to rock in the casing of the lamp with its arms surrounding, and operatively connected to, the source of light, and manually operated means for rocking the lever.

By providing a forked lever as described I eliminate edging of the lever which may occur in one-sided plain levers, and the edging may be further counteracted by making the lever resilient.

A flash light according to my invention is simple, cheap and very rugged so that the adjusting mechanism may be relied on to function even under very rough handling.

In a preferred embodiment of my invention I provide the usual resilient tubular guide for the source of light in which it is mounted to slide against some friction, and arrange this guide together with the rocking lever and the contacting means for connection with the battery, on an insulating or insulated plate in the casing. The adjusting mechanism is thus concealed within the casing and will not be interfered with if the casing is damaged. In consequence, the wall of the casing may be made much thinner than in casings where the casing itself is the guide, or the guide extends along one wall of the casing. The reduced wall thickness is important in a cheap article like a flash light.

By adjusting the source of light with respect to its reflector, I may obtain a divergent, parallel, or convergent beam. By my improved adjusting mechanism I effect a very fine regulation within considerable limits, and such regulation is maintained permanently on account of the simple and rugged construction of the adjusting mechanism. The resiliency of the rocking lever is another factor making for reliability under the severest conditions.

In the accompanying drawings flash lights embodying my invention are illustrated diagrammatically by way of example.

In the drawings

Figs. 4, 5, and 6 illustrate means for constituting a bearing for the manually operated lever-rocking means.

Figure 1:
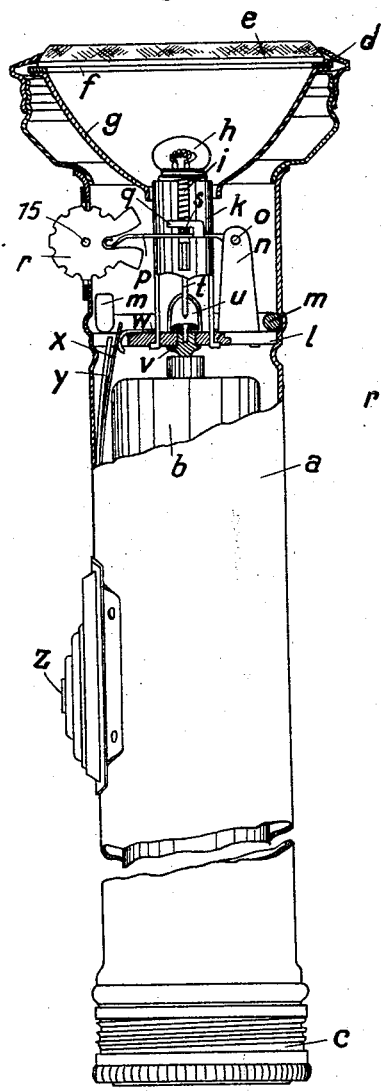
Fig. 1 is a partly sectional elevation of a flash light.

Referring now to the drawings, and first to Fig. 1, $a$ is the casing of a flash light, $b$ is its battery, $c$ is its screw cap, with a spring, not shown, inserted between the battery and the cap, $d$ is a threaded sleeve seated on the reflector end of the casing $a$, with a glass plate $e$, and an annular washer $f$ for holding the reflector $g$, and $h$ is the source of light. The source of light is here shown as a bulb in a threaded sleeve $i$ in which it is held by the usual threaded plug. The upper end of the sleeve is unthreaded at $i'$.

$l$ is a plate of insulating material which is held in the casing by a split ring $m$ in a croze. The plate may also be of conducting material, and insulated. $k$ is a tubular guide on the plate $l$ in which the sleeve $i$, $i'$ is fitted to slide, and held by friction. The guide is slotted at opposite sides for the reception of two pins $s$ on the sleeve $i$. Any more slots may be provided in the guide, if desired.

$n$ is a bearing block on the plate $l$ which may be of channel section, $o$ is a pivot in the block, and $p$ is a forked lever mounted to rock on the pin $o$. The two arms of the forked lever $p$ surround the guide $k$ and are equipped with hooks $q$ for engaging the pins $s$. The hook $q$ which is shown is obviously duplicated on the opposite side of the guide $k$. $r$ is a hand wheel which is mounted to rotate about a shaft 15 in the casing $a$ so as to partly project from the casing, with its projecting portion knurled, and the portion within the casing slotted for the reception of the end of the forked lever $p$. The lever $p$ may be resilient for the reasons stated.

The means for supplying current to the bulb $h$ include a pin $t$ on the sleeve $i$, a bent-up strip $u$ which engages the pin $t$, a hollow rivet $v$ for holding the strip $u$ by its one end, and making contact at the battery by its other end, a contact strip $w$ which is connected to the sleeve $k$, a contact spring $x$ which extends to the strip $w$ through a slot in the plate $l$, and an insulating strip $y$ to which the spring $x$ is secured. The spring $x$ makes contact with the other terminal of the battery $b$, under the control of a push-button $z$.

If the push button $z$ is operated in the usual manner the insulating strip $y$ brings the spring $x$ to bear on the outer end of the strip $w$, as shown in Fig. 1, and the following circuit is established: Carbon terminal of battery $b$, hollow rivet $v$, springs $u$, pin $t$, filament of bulb $h$, sleeve $i$, $i'$, guide $k$, strip $w$, spring $x$, and zinc terminal of battery $b$.

Figure 2:
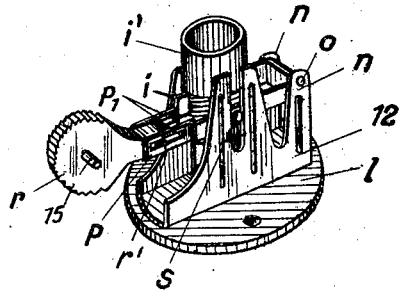
Fig. 2 is a perspective illustration of its focussing means, slightly modified.
Figure 3:
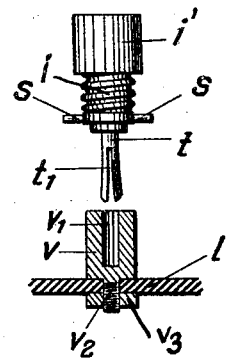
Fig. 3 is a partly sectional elevation of slightly modified current-supplying means.

Fig. 2 illustrates a modified type of adjusting mechanism on the plate $l$, corresponding parts being marked with the same reference letters as in Fig. 1. The bearing block $n$ is here shown as a substantially U-shaped frame with the pivot $o$ at one end, and vertical slots for the reception of the pins $s$ on the sleeve $i$, $i'$. The pins engage in slots in the arms of the forked lever $p$. The hand wheel $r$ is equipped with pins $r'$ at its inner end which engage in slots $p'$ in the arms of the lever $p$.

The contacting means are somewhat modified. The hollow member $v$ which is here shown with a threaded end $v^2$ inserted in the plate $l$, and held by a nut $v^3$, has a central bore $v'$ in which the split end $t'$ of the pin $t$ is mounted to slide.

It will be understood that the plate $l$ with the parts mounted thereon is a self contained unit which is adapted to be inserted in a casing. This is particularly advantageous for progressive manufacture. The plate also acts as a bracing member for the casing as its edge engages the wall of the casing throughout, and as a partition for the battery and lamp chambers.

Referring now to Figs. 4 to 6, this lamp is designed like the one shown in Fig. 1 but with the plate $l$ as shown in Fig. 2, and corresponding parts are marked with the same reference letters.

Connected to the reflector sleeve $d$ by a taper 11 is a tube 12 which fits the upper end of the casing $a$ and is equipped with a groove 11' and two slots 13, 14 at right angles to each other. 16 is a short croze in the wall of the casing $a$ which together with the groove 11' forms a bearing for the shaft 15 of the hand wheel $r$. The casing is slotted at 13' for the reception of the hand wheel $r$. The width of the slot 13' is equal to that of the longitudinal slot 13 in the tube 12, and the length of the transverse slot 14 is about equal to the length of the shaft 15. The slot 13' intersects the croze 16 at its centre.

To assemble the parts the shaft 15 is placed in the croze 16, with the slot 14 in the tube 12 registering with the croze 16, and the tube is then pushed home until the groove 11' registers with the croze 16.

It will be understood that the means for supporting the hand wheel $r$ and its shaft 15, are extremely simple and most readily assembled.

I claim:

1. In a flash light having a casing, a reflector, and a source of light mounted to be adjusted with respect to said reflector, a battery in said casing, a plate of insulating material in said casing intermediate said battery and said source of light, a guide of channel section on said plate having slots, a socket for said source of light, pins on said socket adapted to move in said slots, a forked lever mounted to rock in said guide, with its arms surrounding said socket and engaging said pins, and manually operated means for rocking said lever.

2. In a flash light having a casing, a reflector, and a source of light mounted to be adjusted with respect to said reflector, a socket for said source of light, a forked lever mounted to rock in said casing with its arms surrounding, and operatively connected to said socket, manually operated means for rocking said lever, a battery in said casing, a fixed contact sleeve connected to said battery, and a plug contact connected to said socket and adapted to fit said sleeve.

3. In a flash light having a casing, a reflector, and a source of light mounted to be adjusted with respect to said reflector, a socket for said source of light, a forked lever mounted to rock in said casing with its arms surrounding and operatively connected to said source of light, a shaft, a hand wheel on said shaft operatively connected to said lever, a sleeve adapted to be inserted in said casing and having a groove for the reception of said shaft, and slots for said shaft and said hand wheel to pass through, and a bearing member on said casing adapted to make up a complete bearing for said shaft with said groove in said sleeve.

4. In a flash light having a casing, a reflector, and a source of light mounted to be adjusted with respect to said reflector, a battery in said casing, a plate of insulating material in said casing intermediate said battery and said source of light, a guide on said plate having slots, a socket for said source of light, pins on said socket adapted to move in said slots, a forked lever mounted to rock on said plate, with its arms surrounding said socket and engaging said pins, and manually operated means for rocking said lever.

In testimony whereof I have affixed my signature.

PAUL ROSENBERG.